(12) United States Patent
Yang et al.

(10) Patent No.: US 11,317,138 B2
(45) Date of Patent: Apr. 26, 2022

(54) METHOD AND APPARATUS FOR TRANSMITTING OR RECEIVING SERVICE SIGNALING FOR BROADCASTING SERVICE

(71) Applicant: Samsung Electronics Co., Ltd., Suwon-si (KR)

(72) Inventors: Hyun-Koo Yang, Seoul (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 15/567,267

(22) PCT Filed: Apr. 18, 2016

(86) PCT No.: PCT/KR2016/004022
§ 371 (c)(1),
(2) Date: Oct. 17, 2017

(87) PCT Pub. No.: WO2016/167632
PCT Pub. Date: Oct. 20, 2016

(65) Prior Publication Data
US 2018/0098111 A1    Apr. 5, 2018

(30) Foreign Application Priority Data

Apr. 17, 2015   (KR) ........................ 10-2015-0054719
Apr. 24, 2015   (KR) ...................... 10-2015-005 8107
Jul. 29, 2015   (KR) ........................ 10-2015-0107526

(51) Int. Cl.
*H04N 21/43*      (2011.01)
*H04N 21/462*     (2011.01)
(Continued)

(52) U.S. Cl.
CPC .......... *H04N 21/43* (2013.01); *H04N 13/167* (2018.05); *H04N 13/194* (2018.05); *H04N 19/46* (2014.11);
(Continued)

(58) Field of Classification Search
CPC .... H04N 21/43; H04N 21/6125; H04N 21/63; H04N 21/631; H04N 21/6332;
(Continued)

(56) References Cited

U.S. PATENT DOCUMENTS 10,715,859 B2 *   7/2020   Kwak ................ H04N 21/6125
2008/0307478 A1  12/2008   Kim et al.
(Continued)

FOREIGN PATENT DOCUMENTS

CN      104247436 A     12/2014
EP      2 849 440 A1    3/2015
(Continued)

OTHER PUBLICATIONS

DVB, "ETSI EN 300 468 V1.15.1-rev-107-SI Specification. docx", Digital Video Broadcasting (DVB); Specification for Service Information (SI) in DVB systems, Jan. 9, 2015, pp. 22, 23, 27, 28, 29, 36, 78, and 80, XP017845755, Geneva, Switzerland.
(Continued)

*Primary Examiner* — Nam T Tran
(74) *Attorney, Agent, or Firm* — Jefferson IP Law, LLP

(57) ABSTRACT

A method and apparatus for transmitting or receiving service signaling for a broadcasting service is disclosed. The method for transmitting service signaling for a broadcasting service comprises the steps of: generating a first packet stream including first media data by a first transmission protocol; generating a second packet stream including second media data by a second transmission protocol; generating a user service description including service signaling related to at
(Continued)

least one of the first packet stream and the second packet stream; and transmitting the first packet stream, the second packet stream, and the user service description.

15 Claims, 11 Drawing Sheets

(51) Int. Cl.
| | |
|---|---|
| *H04N 19/46* | (2014.01) |
| *H04N 21/235* | (2011.01) |
| *H04N 21/236* | (2011.01) |
| *H04N 21/643* | (2011.01) |
| *H04N 21/2362* | (2011.01) |
| *H04N 21/2381* | (2011.01) |
| *H04N 21/434* | (2011.01) |
| *H04N 21/63* | (2011.01) |
| *H04N 21/6332* | (2011.01) |
| *H04N 21/61* | (2011.01) |
| *H04N 21/6437* | (2011.01) |
| *H04N 13/167* | (2018.01) |
| *H04N 13/194* | (2018.01) |
| *H04N 21/2665* | (2011.01) |
| *H04L 29/06* | (2006.01) |
| *H04L 65/80* | (2022.01) |

(52) U.S. Cl.
CPC ....... *H04N 21/235* (2013.01); *H04N 21/2362* (2013.01); *H04N 21/2381* (2013.01); *H04N 21/23614* (2013.01); *H04N 21/2665* (2013.01); *H04N 21/4345* (2013.01); *H04N 21/4348* (2013.01); *H04N 21/4622* (2013.01); *H04N 21/6125* (2013.01); *H04N 21/63* (2013.01); *H04N 21/631* (2013.01); *H04N 21/6332* (2013.01); *H04N 21/643* (2013.01); *H04N 21/6437* (2013.01); *H04N 21/64322* (2013.01); *H04L 65/80* (2013.01)

(58) Field of Classification Search
CPC ............. H04N 21/643; H04N 21/6437; H04N 21/2665; H04L 65/80
See application file for complete search history.

(56) References Cited

U.S. PATENT DOCUMENTS

| | | | |
|---|---|---|---|
| 2010/0050070 A1 | 2/2010 | Suh et al. | |
| 2011/0125918 A1 | 5/2011 | Ha et al. | |
| 2013/0291027 A1 | 10/2013 | Hwang et al. | |
| 2013/0293677 A1 | 11/2013 | Lee et al. | |
| 2014/0245371 A1 | 8/2014 | Lee et al. | |
| 2014/0317674 A1 | 10/2014 | Hwang et al. | |
| 2015/0012956 A1 | 1/2015 | Kim et al. | |
| 2015/0052570 A1 | 2/2015 | Lee et al. | |
| 2016/0127756 A1 | 5/2016 | Oh et al. | |
| 2016/0173945 A1* | 6/2016 | Oh | H04N 21/438 725/110 |
| 2016/0294914 A1 | 10/2016 | Kwon et al. | |
| 2016/0337672 A1* | 11/2016 | Lee | H04N 21/236 |
| 2017/0195153 A1* | 7/2017 | Kwak | H04L 29/06 |
| 2018/0020244 A1* | 1/2018 | Oh | H04L 69/324 |
| 2019/0037262 A1 | 1/2019 | Oh et al. | |

FOREIGN PATENT DOCUMENTS

| | | |
|---|---|---|
| JP | 2017-505080 A | 2/2017 |
| KR | 10-2008-0107060 A | 12/2008 |
| KR | 10-2009-0066191 A | 6/2009 |
| KR | 10-2011-0053178 A | 5/2011 |
| KR | 10-2014-0090977 A | 7/2014 |
| WO | 2012/099359 A2 | 7/2012 |
| WO | 2013/055032 A1 | 4/2013 |
| WO | 2013/089437 A1 | 6/2013 |
| WO | 2014/171718 A1 | 10/2014 |
| WO | 2014/209057 A1 | 12/2014 |
| WO | 2015/008986 A1 | 1/2015 |
| WO | 2016/064150 A1 | 4/2016 |

OTHER PUBLICATIONS

Advanced Television Systems Committee (ATSC), "S33-174rl-Signal-Deliverty-Sync-FEC.pdf", ATSC Candidate Standard: Signaling, Delivery, Synchronization, and Error Protection (A/311), Feb. 3, 2016, pp. 9-39. XP017848752.
Chinese Office Action dated Jul. 19, 2019, issued in Chinese Application No. 201680022488.5.
Japanese Office Action dated Sep. 10, 2019, issued in Japanese Application No. 2017-554474.
Chinese Office Action dated Aug. 14, 2020, issued in Chinese Patent Application No. 201680022488.5.
Counterpart Indian application Examination report dated Mar. 23, 2021, issued in Indian Patent Application No. 201717039999.
Korean Office Action dated Jul. 23, 2021, issued in Korean Patent Application No. 10-2015-0107526.

\* cited by examiner

METHOD AND APPARATUS FOR TRANSMITTING OR RECEIVING SERVICE SIGNALING FOR BROADCASTING SERVICE

PRIORITY

This application is a National Phase Entry of PCT International Application No. PCT/KR2016/004022, which was filed on Apr. 18, 2016, and claims priorities to KR Patent Application Nos. 10-2015-0054719 filed on Apr. 17, 2015, 10-2015-0058107 filed on Apr. 24, 2015 and 10-2015-0107526 filed on Jul. 29, 2015, the contents of which are incorporated herein by reference.

TECHNICAL FIELD

The present disclosure relates to a method and apparatus for providing service signaling related to contents forming a broadcasting service.

BACKGROUND ART

A digital broadcasting service transmits not only various types of multimedia contents to be provided to users, but also meta information needed during selection, reception, and playback of the multimedia contents, that is, signaling information. The signaling information is roughly divided into service acquisition information and service announcement information. The service acquisition information includes information needed for reception and playback of a broadcasting service, for example, media component information forming the service, decoder configuration information needed for reception and playback of the media component information, etc. The service announcement information is information a user may use when selecting a broadcasting service, and is used to provide richer information. For example, program schedule information, additional service information related to a service, and so forth may be provided. A receiver selects a broadcasting service based on the service announcement information, obtains the service acquisition information related to the broadcasting service through a broadcasting signal, and finally provides the broadcasting service to a user.

Thus, a need exists for a scheme for efficiently providing and processing signaling information delivered to a user to receive and play a digital broadcasting service.

DETAILED DESCRIPTION OF THE INVENTION

Technical Problem

The present disclosure provides a method and apparatus for efficiently providing service signaling related to contents forming a broadcasting service.

The present disclosure also provides a method and apparatus for delivering signaling provided by a broadcasting service through a predetermined transmission scheme and at least one transport protocol in a broadcasting system using the at least one transport protocol.

Moreover, the present disclosure provides a method and apparatus for supporting a table structure for transmitting signaling needed for reception and play of a broadcasting service selected by a receiver.

Technical Solution

A method for transmitting service signaling for a broadcasting service according to an embodiment of the present disclosure includes generating a first packet stream including first media data according to a first transport protocol, generating a second packet stream including second media data according to a second transport protocol, generating a user service description (USD) including service signaling related to at least one of the first packet stream and the second packet stream, and transmitting the first packet stream, the second packet stream, and the USD.

A method for receiving service signaling for a broadcasting service according to an embodiment of the present disclosure includes receiving a broadcasting signal, extracting, from the broadcasting signal, a first packet stream including first media data according to a first transport protocol, a second packet stream including second media data according to a second transport protocol, and a USD including service signaling related to at least one of the first packet stream and the second packet stream, and decoding at least one of the first packet stream and the second packet stream by using the USD.

An apparatus for transmitting service signaling for a broadcasting service according to an embodiment of the present disclosure includes a processing unit configured to generate a first packet stream including first media data according to a first transport protocol, to generate a second packet stream including second media data according to a second transport protocol, to generate a USD including service signaling related to at least one of the first packet stream and the second packet stream, and a transmission unit configured to transmit the first packet stream, the second packet stream, and the USD.

An apparatus for receiving service signaling for a broadcasting service according to an embodiment of the present disclosure includes a reception unit configured to receive a broadcasting signal and a processing unit configured to extract, from the broadcasting signal, a first packet stream including first media data according to a first transport protocol, a second packet stream including second media data according to a second transport protocol, and a USD including service signaling related to at least one of the first packet stream and the second packet stream, and to decode at least one of the first packet stream and the second packet stream by using the USD.

MODE FOR CARRYING OUT THE INVENTION

Figure 1:
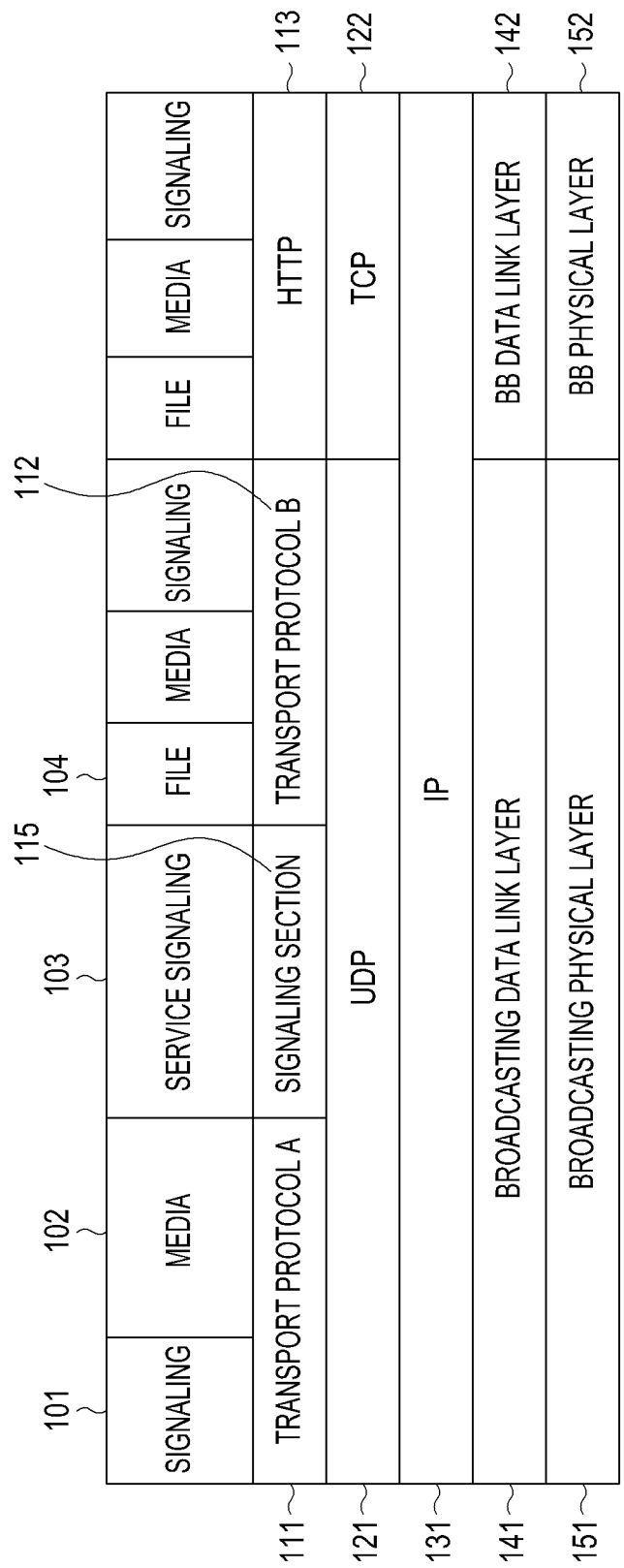
FIG. 1 illustrates an example of a protocol stack of an Internet Protocol (IP)-based broadcasting system according to an embodiment of the present disclosure.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

In a digital broadcasting system, to allow a receiver to receive a digital broadcasting service and smoothly play the received digital broadcasting service, service-related signaling to the receiver. Such service-related signaling may be transmitted through, for example, a data link layer or an application layer, and a type of signaling transmitted in each layer may vary with a digital broadcasting standard. When signaling is transmitted through a data link layer, only a minimum amount of signaling needed in a process from service selection to service playback is transmitted, taking a transmission bandwidth, a channel mapping time, etc. into account. When signaling is transmitted through an application layer, more various and richer signaling than signaling through the data link layer may be transmitted.

Examples of standard specifications for signaling of a broadcasting service may include program specific information (PSI)/service information (SI) of a Moving Picture Experts Group (MPEG)-2 Transport Stream (TS), an Open Mobile Alliance-Mobile Broadcast Services (OMA-BCAST) electronic service guide (ESG), and so forth.

Signaling transmitted through the data link layer has a table structure for efficient storage and transmission. The table structure may be a single table form storing all information or may include tables of a hierarchy structure configured variously according to purposes, and the tables of the hierarchy structure may be correlated based on a table ID. For example, a representative table structure used in the MPEG-2 TS may include a program association table (PAT) storing service configuration information included in the TS and a program map table (PMT) storing media component configuration information of a separate service. The PAT and the PMT may be interconnected using an attribute "program_number". The receiver may perform the following procedure to obtain detailed information about a particular service X. That is, by using an attribute "program_number" of a service X obtained through the PAT, the receiver analyzes the PMT having the identical attribute "program_number", thereby obtaining additional information about a separate media component of the service X.

When signaling needed in a process from selection to playback of a broadcasting service is transmitted through the data link layer, tables to be used are configured in the form of a service map. In this case, information related to a media component forming a service and information needed to receive the component exist in the same table, degrading scalability of the table. For example, the PMT, which is a table defined in the PSI/SI of the MPEG-2 TS, may include detailed information of a media component forming a service and a packet identifier (PID) of an elementary stream of an MPEG-2 TS necessary for receiving the component. That is, the PMT is closely coupled with information used in a low transport layer, such that reuse of the PMT in an environment using a transport protocol other than the MPEG-2 TS is impossible. Moreover, in a hybrid service scenario where an identical media component is transmitted using a transport protocol other than the MPEG-2 TS or using a plurality of transport mediums such as another broadcasting network or wideband communication network, a technique for transmitting signaling through the data link layer is not supported. Thus, in a present-day broadcasting service trend where importance and user demands for an integrated service of a broadcasting network and a wideband communication network are increasing, a need exists for efficient transmission of signaling.

In a broadcasting system, signaling is physically separated into service announcement information and service acquisition information and transmitted through different transport layers, increasing the complexity of establishment of a database (DB) of signaling and a time needed to play a service. A representative example may be a digital video broadcasting (DVB)-generic stream encapsulation (GSE) standard. In the DVB-GSE, signaling required in a network layer and a physical/data link layer needed for broadcasting reception is transmitted using two tables, that is, a network control data (NCD) table and a link control data (LCD) table. The LCD table provides information related to an IP stream currently transmitted, and the LCD table includes information related to a physical/data link layer required for reception of the IP stream, e.g., frequency information or the like. However, in the two tables, the service announcement information is omitted and only information for physically receiving a broadcasting signal is included, such that the receiver may not be table to perform the whole process from service selection to playback merely by using information of the NCD table and the LCD table. To solve this problem, the DVB-GSE analyzes data included in a data payload of a DVB-GSE packet in a high layer and additionally transmits signaling of a service layer, i.e., service signaling, thereby complementing the NCD table and the LCD table.

An IP-based broadcasting system transmits media data and file and signaling by using an IP-based transport protocol unlike a typical broadcasting system based on the MPEG-2 TS. However, when signaling is transmitted to the data link layer in the IP-based broadcasting system, IP retransmission of signaling may be impossible or signaling transmitted to the data link layer has to be mapped to a separate IP session for retransmission. When a transmitter transmits all signaling through an application layer without transmitting signaling through the data link layer, there is no way to deliver information necessary for obtaining an IP session in which signaling is transmitted, after a receiver tunes in a physical channel.

Thus, in embodiments of the present disclosure described below, a logical channel in which signaling is transmitted is designated for one physical channel, and a user datagram protocol (UDP)/IP session is allocated to the logical channel for transmission of signaling. An example of the logical channel may include a physical layer pipe (PLP) defined in the Digital Video Broadcasting—Second Generation Terrestrial (DVB-T2), the Advanced Television System Committee (ATSC) 3.0, etc. Hereinbelow, the logical channel in which signaling is transmitted will be referred to as a signaling PLP.

When there are a plurality of PLPs mapped to one physical channel, each PLP has a unique identifier. In this case, an identifier of a signaling PLP may use a pre-agreed value such as 0, etc., or may be delivered to the receiver through physical layer signaling. For an address and a port number of a UDP/IP session allocated to the signaling PLP, pre-agreed values or arbitrary values may be used. Thus, the receiver decodes the signaling PLP after tuning in the physical channel and processes IP packets transmitted in the UDP/IP session of the signaling PLP, thereby obtaining signaling.

Therefore, in an embodiment of the present disclosure, when signaling necessary for service reception and playback is transmitted, the signaling is classified depending on layers such as a physical channel level, a service level, a transmission session level, a component level, etc., and signaling classified depending on the levels is stored as tables that are mutually independent of one another in a logical or physical manner. In an embodiment of the present disclosure, information corresponding to two or more levels of the classified signaling is logically or physically stored as one table.

FIG. 1 illustrates an example of a protocol stack of an IP-based broadcasting system according to an embodiment of the present disclosure.

Referring to FIG. 1, the broadcasting system uses two transport protocols 111 and 112 in a broadcasting network to transmit signaling 101, media 102, and a file 104, and uses one transport protocol 113 in a broadband (BB) network. The two transport protocols 111 and 112 will be referred to as a transport protocol A 111 and a transport protocol B 112, respectively. Service signaling 103 may be transmitted using a data structure of a signaling section 115 without passing through the transport protocol A 111 and the transport protocol B 112. The signaling section 115 has a simpler data structure than the transport protocols 111 and 112 and a detailed structure thereof will be described in the embodiments described below. In the broadcasting network, outputs of the transport protocol A 111, the transport protocol B 112, and the signaling section 115 are allocated to a session based on a UDP 121, respectively, are encapsulated into a packet based on an IP 131, and then are processed in a broadcasting data link layer 141 and a broadcasting physical layer 151 and delivered to a receiver. In the BB network, a hyper text transfer protocol (HTTP) 113 is used as an example of the transport protocol, and an output of the HTTP 113 is sequentially processed in a TCP 122, an IP 131, a BB data link layer 142, and a BB physical layer 152 and delivered to the receiver.

Although it is shown in FIG. 1 that the transport protocol A 111 transmits the signaling 101 and the media 102 and the transport protocol B 112 transmits all of signaling, media, and a file 104, this is merely an example for describing an embodiment of the present disclosure and a type of data the transport protocols 111 and 112 transmit may vary with implementation.

Table 1 shows an example of a data structure of the signaling section 115 for transmitting the service signaling 103 according to an embodiment of the present disclosure.

For example, a signaling message including service signaling of the signaling section 115 may include at least one of IEs shown in Table 1.

TABLE 1

| Syntax | No. of Bits | Format |
|---|---|---|
| at sc3_message_section( ) { | | |
|    service_id | 16 | uimsbf |
|    message_id | 16 | uimsbf |
|    version | 8 | uimsbf |
|    message_length | 32 | uimsbf |
|    message_type | 8 | uimsbf |
|       URI_flag | 1 | uimsbf |
|    fragmentation_indicator | 2 | uimsbf |
|    reserved | 5 | 11111b |
|    if (fragmentation_indicator != 0) { | | |
|       message_section_length | 32 | uimsbf |
|    } | | |
|    for (i=0; i<message_section_length; i++) { | | |
|       message_section_bytes | 8 | uimsbf |
|    } | | |
|    if (URI_flag) { | | |
|       URI_length | 8 | uimsbf |
|       for (i=0; i<URI_length;i++) { | | |
|          message_URI_byte | 8 | uimsbf |
|       } | | |
|    } | | |
| } | | |

In Table 1, each element has a meaning as described below.

service_id—an identifier for identifying a service related to a message on a physical channel in which signaling of a signaling section is transmitted.

message_id—an identifier for identifying a message including signaling for a service.

version—an integer that increases by 1 whenever contents of a message change. This is reset to 0 if reaching a maximum value. Information included in a message having the greatest version value among messages having an identical message_id is effective.

message_length—a total length of a message. If the message is fragmented into several sections, that is, a value of a fragmentation_indicator field is no '00', a value of a message_length field is equal to a sum of values of message_section_length fields of all sections in which values of message_id and version are the same as each other.

message_type—a type of a fragment applied to the message (hereinafter, referred to as a fragment type). For example, the meaning of a fragment type according to a value of message_type is as shown in Table 2.

TABLE 2

| message_type | Meaning |
|---|---|
| 0x00 | Reserved |
| 0x01 | MPEG-2 TS section |
| 0x02 | userServiceDescription fragment |
| 0x03 | S-TSID fragment |
| 0x04 | MPD |
| 0x05 | MPT message |
| 0x06 | CRI message |
| 0x07~0xFF | Reserved for future use |

In Table 2, an S-TSID fragment means a service-based transport session instance description (S-TSID) which is one of service signaling. An MPD means media presentation description that is one of service signaling. An MPT message means an MPEG media transport (MMT) package table. A CRI message means clock relation information.

URI_flag—a field indicating whether the message provides a uniform resource identifier (URI). If a value of the URI_flag field is 1, there is(are) field(s) related to message_URI at the end of the current section included in the message.

fragmentation_indicator—a description of a fragment of a message transmitted through the current section. A description according to a value of fragmentation_indicator is as shown below.

TABLE 3

| Value | Description |
| --- | --- |
| 00 | This section contains one complete signaling messages. |
| 01 | This section contains the first fragment of a signaling message |
| 10 | This section contains a fragment of a signaling message that is neither the first nor the last fragment. |
| 11 | This section contains the last fragment of a signaling message. |

In Table 3, '00' means that the current section includes one complete signaling message. '01' means that the current section includes the first fragment of one signaling message. '10' means that the current section includes a fragment that is not either the first or the last of one signaling message. '11' means that the current section includes the last fragment of one signaling message.

message_section_length—a length of a message included in the current section. This exists only when a signaling message is divided.

message_section_byte—the actual number of bytes of a message according to a value of the message_type field.

message_URI_length—a length of a URI specifying the message.

message_URI_byte—the actual number of bytes of a URI in the message except for terminating null character(s).

Figure 2:
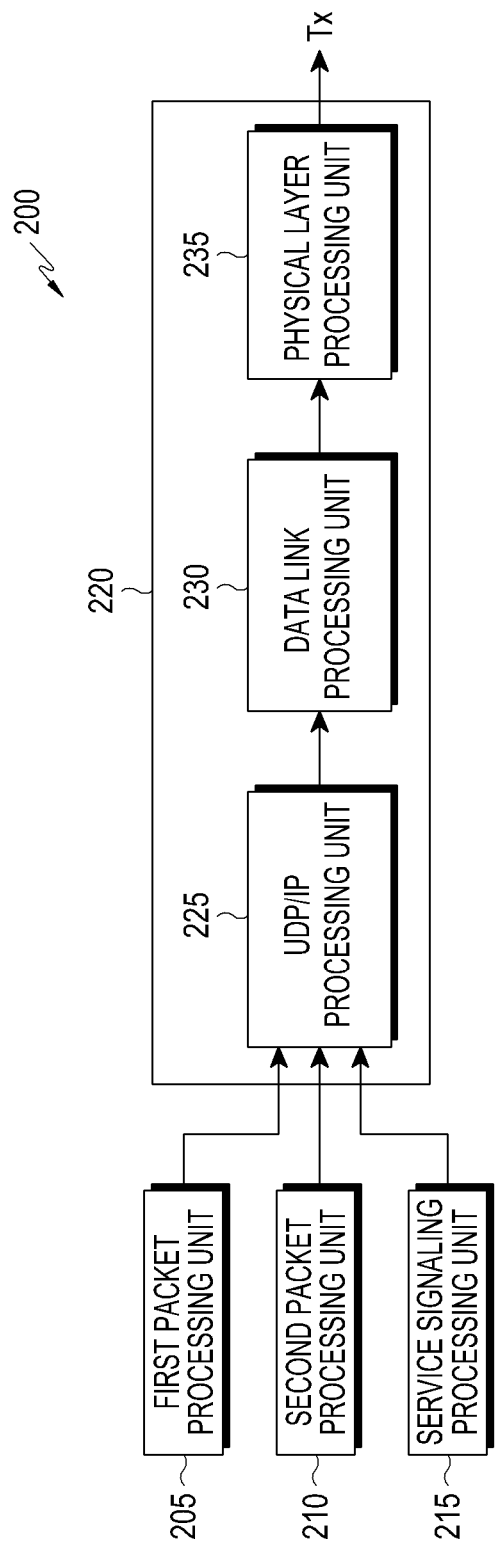
FIG. 2 is a block diagram of a transmitter of a broadcasting system according to an embodiment of the present disclosure.

FIG. 2 is a block diagram of a transmitter of a broadcasting system according to an embodiment of the present disclosure.

Referring to FIG. 2, a transmitter 200 may include a first packet processing unit 205, a second packet processing unit 210, a service signaling processing unit 215, and a transmission unit 220. The first packet processing unit 205 generates a packet stream according to a transport protocol A by processing (e.g., encoding and packetizing) at least one of signaling, media, and a file according to the transport protocol A. The second packet processing unit 210 generates a packet stream according to a transport protocol B by processing (e.g., encoding and packetizing) at least one of signaling, media, and a file according to the transport protocol B. The service signaling processing unit 215 generates a signaling message containing service signaling related to a service provided by the transport protocol A and/or the transport protocol B. The signaling message may be generated, for example, in the form of a packet stream.

Packet streams generated by the processing units 205, 210, and 215 are carried in a broadcasting signal and transmitted to a receiver, through a UDP/IP processing unit 225, a data link processing unit 230, and a physical layer processing unit 235 in the transmission unit 220.

Figure 3:
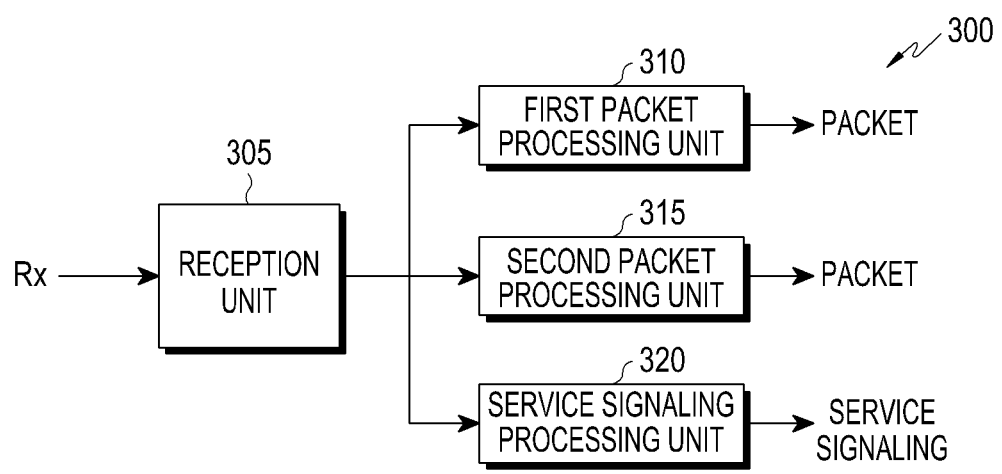
FIG. 3 is a block diagram of a receiver of a broadcasting system according to an embodiment of the present disclosure.

FIG. 3 is a block diagram of a receiver of a broadcasting system according to an embodiment of the present disclosure.

Referring to FIG. 3, a reception unit 305 of a receiver 300 receives a broadcasting signal and performs operations inverse to processing by the transmission unit 220 of the transmitter 200 to recover at least one of a packet stream according to the transport protocol A, a packet stream according to the transport protocol B, and a signaling message including service signaling. The first packet processing unit 310 recovers at least one of signaling, media, and a file by performing, with respect to the recovered packet stream based on the transport protocol A, operations (depacketizing and decoding) inverse to processing by the first packet processing unit 205 of the transmitter 200.

The first packet processing unit 310 recovers at least one of signaling, media, and a file by performing, with respect to the recovered packet stream based on the transport protocol A, operations (depacketizing and decoding) inverse to processing by the first packet processing unit 205 of the transmitter 200. The second packet processing unit 315 recovers at least one of signaling, media, and a file by performing, with respect to the recovered packet stream based on the transport protocol B, operations (depacketizing and decoding) inverse to processing by the second packet processing unit 210 of the transmitter 200. The signaling processing unit 320 recovers information of service signaling by performing, with respect to the recovered signaling message, operations (depacketizing and decoding) inverse to processing by the service signaling processing unit 215 of the transmitter 200.

Hereinbelow, schemes for configuring service signaling according to various embodiments of the present disclosure will be described.

Figure 4:
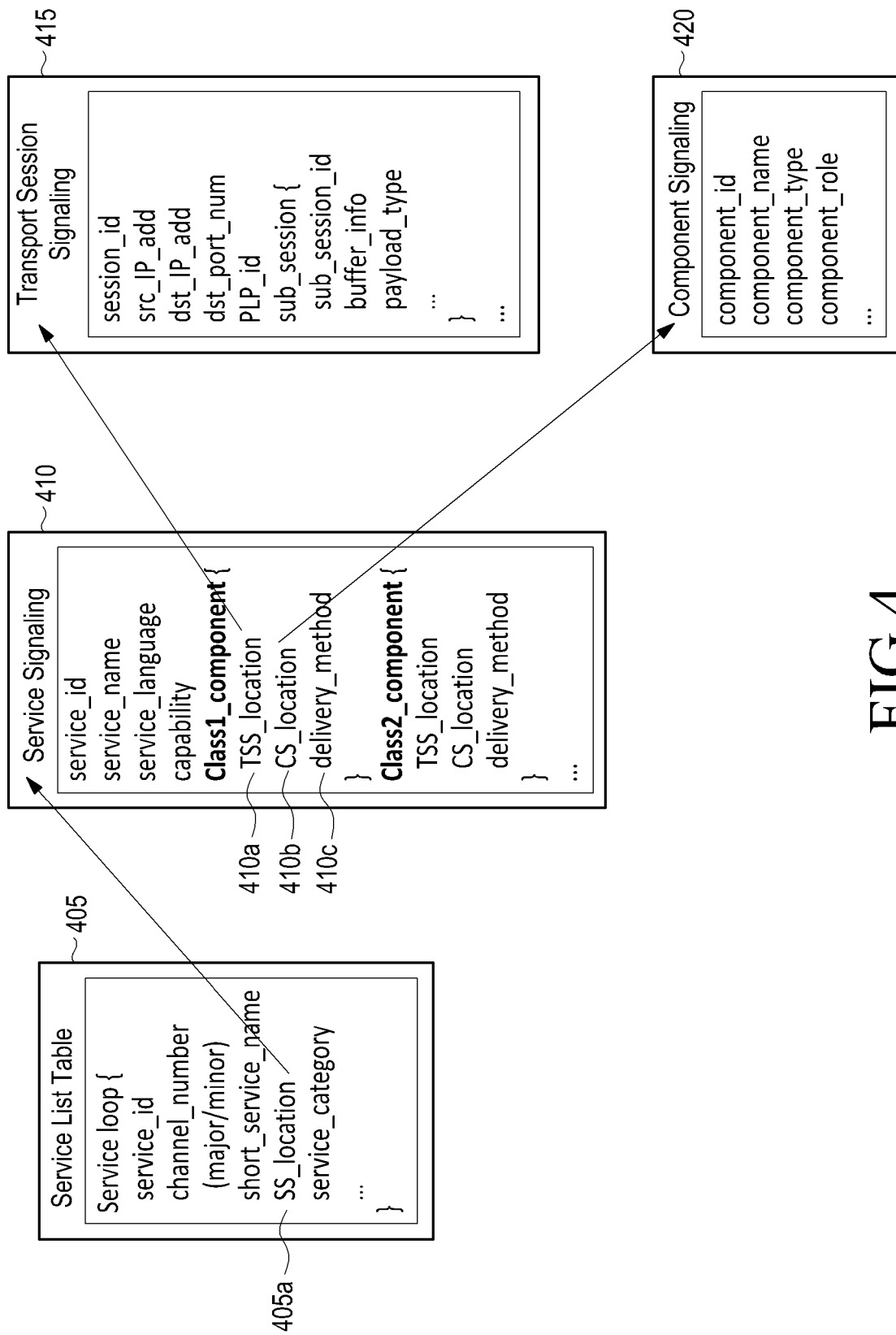
FIG. 4 illustrates an example of a signaling configuration scheme of an IP-based broadcasting system according to an embodiment of the present disclosure.

FIG. 4 illustrates an example of a signaling configuration scheme of an IP-based broadcasting system according to an embodiment of the present disclosure.

Referring to FIG. 4, a service list table (SLT) 405 may include not only basic information about a service such as service_id indicating a service ID for each service, channel_number indicating a channel number, short_service_name indicating a short service name, and service_category indicating a service category, but also SS_location 405a indicating a service signaling location for obtaining service signaling 410.

The SS_location 405a may include at least one of an identifier of a protocol used to encapsulate the service signaling 410 of a service, an identifier for identifying a packet including the service signaling 410 in a packet generated according to the protocol, and an identifier of a PLP in which the packet including the service signaling 410 is transmitted.

In another example, both the SLT 405 and the service signaling 410 may be encapsulated into the signaling section 115 and transmitted through a signaling PLP, and in this case, the SS_location 405a may be omitted from the SLT 405. In this case, the SLT 405 may be identified through a message_id field shown in Table 1 or by a message_type field shown in Table 1. When the message_type field is used, a definition of the message_type field shown in Table 2 may further include a value meaning an SLT fragment.

The service signaling 410 provides basic information such as service_id for identifying a service, service_name, service_language for indicating a service language, and capability. In addition, if each component forming a service is classified into classes corresponding to a protocol, a file format, a purpose (real-time or non-real-time), etc., the service signaling 410 includes a TSS_location field 410a and a CS_location field 410b indicating paths of obtaining transport session signaling (TSS) 415 and component signaling (CS) 420 that are necessary for obtaining and using a component belonging to each class. The service signaling 410 may additionally include a delivery_method field 410c indicating whether the TSS 415 is transmitted through a broadcasting network or a BB network.

The classes may include, for example, service components that use a format of a media protocol unit (MPU) defined in the MPEG H Part 1 and are transmitted using the MMTP, a service component that uses a dynamic adaptive streaming over http (DASH) segment format and is transmitted using the real time object delivery over unidirectional transport (ROUTE) protocol proposed in the Advanced Television Systems Committee (ATSC) 3.0, or a service component that uses a general file format and is transmitted using the ROUTE protocol.

TSS_location 410*a* and CS_location 410*b* indicating the paths of obtaining the TSS 415 and the CS 420, respectively, may be expressed in the same format as SS_location 405*a*. That is, at least one of the TSS_location 410*a* and the CS_location 410*b* may include at least one of an identifier of a protocol used to encapsulate the TSS 415/CS 420, an identifier for identifying a packet including the service signaling 410 in a packet generated according to the protocol, and an identifier of a PLP in which the packet including the service signaling 410 is transmitted.

The TSS 415 may include an identifier session_id for identifying a transport session for each service or in a physical channel. The TSS 415 may further include src_IP_add indicating a source IP address (sIP or srcIP) for connecting to the transport session, dst_IP_add indicating a destination IP address (dIP or dstIP), dst_port_num indicating a destination UDP port number (dPort or dstPort), and PLP_id indicating a PLP identifier. When one transport session is transmitted through a plurality of PLPs according to a transport schedule of a broadcasting network, a plurality of PLP_ids may be included in the TSS 415.

According to an attribute of a transport protocol, one transport session may be divided into a plurality of sub sessions. For example, in case of an MMT protocol, one MMT transport session may be regarded as a plurality of sub sessions depending on a value of packet_id of a packet header. For the ROUTE protocol, a transport session identifier (tsi) of a packet header may be used to identify a sub session. In this case, the TSS 415 may further include sub_session indicating information about each sub session. sub_session may include at least one of sub_session_id indicating an identifier of a sub session, buffer_info indicating information for operating a buffer, and payload_type indicating a payload format of a packet of a sub session.

The CS 420 may include at least one of component_id indicating an identifier of a component, component_name indicating a name of the component, component_type indicating a type of the component, and component_role indicating a role of the component in the service. When only one component is transmitted in one sub session according to a transport protocol, the CS 420 may be physically/logically related with information (that is, fields of sub_session) about a sub session of the TSS 415.

Figure 5:
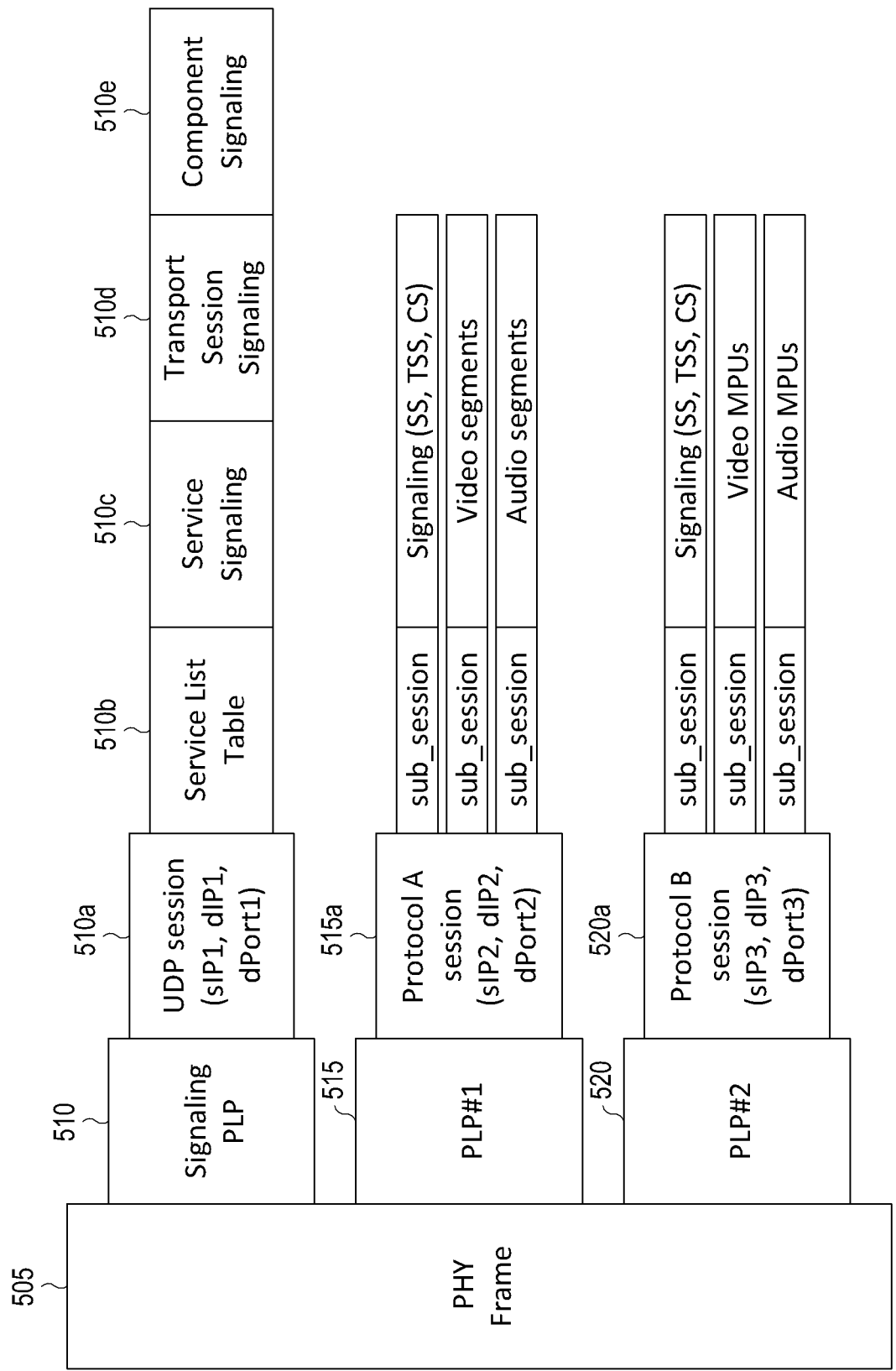
FIG. 5 illustrates an example of a physical channel configuration according to an embodiment of the present disclosure.

FIG. 5 illustrates an example of a physical channel configuration according to an embodiment of the present disclosure.

Referring to FIG. 5, a physical channel frame (PHY Frame) 505 corresponding to one physical channel may include one signaling PLP 510 and two data PLPs #1 and #2 515 and 520. The signaling PLP 510 includes an UDP session 510*a* identified by [sIP1, dIP1, dPort1], and the UDP session 510*a* transmits an SLT 510*b*. In this case, the SLT 510*b* is transmitted in a binary format through a payload of a UDP packet or is encapsulated into the above-described message section and transmitted through the payload of the UDP packet. For example, the SLT 510*b* may include a section of a signaling message as shown in Table 1 or may be configured like the SLT 405 of FIG. 4.

The SLT 510*b* is transmitted through a signaling PLP 510. Although it is shown in FIG. 3 that service/transport session/component signaling 510*c*, 510*d*, and 510*e* is transmitted through the signaling PLP 510, the signaling 510*c*, 510*d*, and 510*e* may be transmitted through at least one of the PLPs 515 and 520, together with media data.

The PLP #1 515 may include a protocol A session 515*a* identified by [sIP2, dIP2, dPort2], and may be classified into at least one sub session. Each sub session may transmit signaling such as service signaling (SS), TSS, or CS, or transmit video segments or audio segments.

The PLP #2 520 may include a protocol B session 520*a* identified by [sIP3, dIP3, dPort3], and may be classified into at least one sub session. Each sub session may transmit signaling such as SS, TSS, or CS, or transmit video segments or audio segments.

Figure 6:
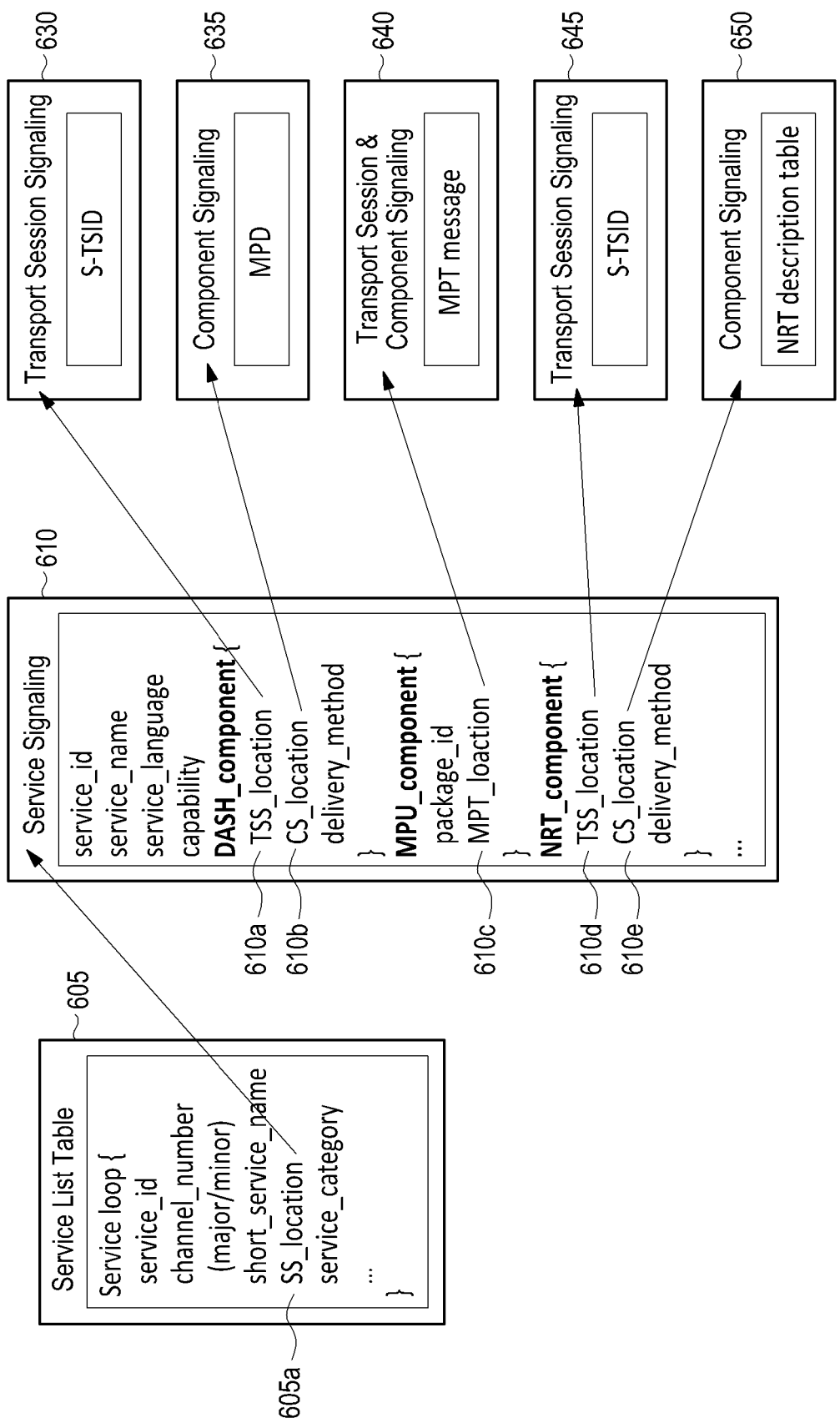
FIG. 6 illustrates an example of a signaling configuration scheme in a broadcasting system according to an embodiment of the present disclosure.

FIG. 6 illustrates an example of a signaling configuration scheme of an IP-based broadcasting system according to an embodiment of the present disclosure.

Referring to FIG. 6, a service list table (SLT) 605 may include not only basic information about a service such as service_id indicating a service ID for each service, channel_number indicating a channel number, short_service_name indicating a short service name, and service_category indicating a service category, but also SS_location 605*a* indicating a service signaling location for obtaining service signaling 610.

The service signaling 610 provides basic information such as service_id for identifying a service, service_name, service_language for indicating a service language, and capability. The USD 910 also includes signaling needed to obtain and use each component of a service. The IP-based broadcasting system applied to FIG. 6 uses MPU and DASH segments as a format of media data, transmits an MPU using the MMT protocol, and transmits the DASH segment and general file data by using the ROUTE protocol. Thus, the service signaling 610 classifies classes of components into DASH_component indicating signaling information (hereinafter, referred to as component information) necessary for receiving a DASH component, MPU_component indicating MPU component information, and NRT_component indicating non-real time (NRT) component information. Each component field includes signaling for transmitting a component of a transport protocol. In this case, DASH segments and NRT components are transmitted using the same transport protocol (i.e., the ROUTE protocol) and thus may be regarded as one class.

The DASH component information includes a TSS_location field 610*a* and a CS_location field 610*b* indicating paths of obtaining TSS 630 and CS 635 for the DASH component. The MPU component information includes an MPT_location field 610*c* indicating a path of obtaining a transport session and component signaling 640 for an MPU. The NRT component information includes a TSS_location field 610*d* and a CS_location field 610*e* indicating paths of obtaining TSS 645 and CS 650. The service signaling 610 may additionally include delivery_method fields indicating whether the TSS 630 and 645 are transmitted through a broadcasting network or a BB network.

The TSS 630 related to transmission of the DASH segment according to the ROUTE/DASH protocol may include an S-TSID fragment, and the CS 635 related to the DASH segment may include a MPD. The transport session and component signaling 640 related to an MPU according to the MMT protocol may include an MPT message. The TSS 645 related to transmission of NRT data may include an S-TSID, and the CS 650 related to the NRT data may include an NRT description table.

Table 4 shows an example of the service signaling 610 according to an embodiment of the present disclosure.

TABLE 4

| Element or Attribute Name | Use | Description |
| --- | --- | --- |
| bundleDescription | | Root element of the User Service Bundle Description. |
| userServiceDescription | | A single instance of an ATSC 3.0 Service. |
| @serviceId | M | Globally unique identifier of the ATSC 3.0 Service. |
| @atsc:serviceId | M | Reference to corresponding service entry in the ATSC3 SLS Fragment message. The value of this attribute is the same value of serviceId assigned to the entry. |
| Name | 0 . . . N | Name of the ATSC 3.0 service as given by the lang attribute |
| Lang | CM | Language of the ATSC 3.0 service name. The language shall be specified according to XML datatypes (XML Schema Part 2). |
| serviceLanguage | 0 . . . N | Available languages of the ATSC 3.00 service. The language shall be specified according to XML datatypes (XML Schema Part 2). |
| atsc:capabilityCode | 0 . . . 1 | Specifies the capabilities and capability groups, as defined in the ATSC 3.0 Service Announcement & Personalization standard, required in the receiver to be able to create a meaningful presentation of the content of this ATSC service. The format of this element shall be identical to the atsc:capabilities element specified under the Content fragment of the ATSC 3.0 Service Announcement & Personalization spec. |
| atsc:Channel | 1 | Contains information about the channel in the service |
| @atsc:majorChannelNo | 1 | Attribute indicates the major channel number of the service. |
| @atsc:minorChannelNo | 1 | Attribute indicates the minor channel number of the service. |
| @atsc:serviceLang | 0 . . . 1 | Attribute indicates the primary language used in the service. Semantics of xml:lang shall be followed. |
| @atsc:serviceGenre | 0 . . . 1 | Attribute indicates primary genre of the service. This attribute shall be instantiated to describe the genre category for the service. The <classificationSchemeURI> is http://www.atsc.org/XMLSchemas/mh/2009/1.0/genre-cs/ and the value of serviceGenre shall matches a termID value from the classification schema in Annex B of A/153 Part 4 |
| @atsc:serviceIcon | 1 | Attribute indicates the Uniform Resource Locator (URL) for the icon used to represent this service. |
| atsc:serviceDescription | 0 . . . N | Contains service description possibly in multiple languages. |
| @atsc:serviceDescrText | 1 | Attribute indicates description of the service. |
| @atsc:serviceDescrLang | 0 . . . 1 | Attribute indicates the language of the serviceDescrText. Semantics of xml:lang shall be followed. |
| atsc:dashComponent | 0 . . . 1 | A description about the contents components of ATSC 3.0 Service delivered as MPEG DASH |
| @atsc:fullMPDUri | M | Reference to an MPD fragment which contains descriptions for contents components of the ATSC 3.0 Service delivered over broadcast and optionally, also over broadband. |
| @atsc:sTSIDUri | M | Reference to the S-TSID fragment which provides access related parameters to the Transport sessions carrying contents of this ATSC 3.0 Service. |
| deliveryMethod | 1 . . . N | Container of transport related information pertaining to the contents of the service over broadcast and (optionally) broadband modes of access. |
| atsc:broadcastAppService | 1 . . . N | A DASH Representation delivered over broadcast, in multiplexed or non-multiplexed form, containing the corresponding media component(s) belonging to the ATSC 3.0 Service, across all Periods of the affiliated Media Presentation. |

TABLE 4-continued

| Element or Attribute Name | Use | Description |
|---|---|---|
| basePattern | 1 ... N | A character pattern for use by the the ATSC receiver to match against any portion of the Segment URL used by the DASH client to request Media Segments of a parent Representation under its containing Period. A match implies that the corresponding requested Media Segment is carried over broadcast transport. |
| atsc:unicastAppService | 0 ... N | A DASH Representation delivered over broadband, in multiplexed or non-multiplexed form, containing the constituent media content component(s) belonging to the ATSC 3.0 Service. across all Periods of the affiliated Media Presentation. |
| basePattern | 1 ... N | A character pattern for use by the the ATSC receiver to match against any portion of the Segment URL used by the DASH client to request Media Segments of a parent Representation under its containing Period. A match implies that the corresponding requested Media Segment is carried over broadband transport. |
| atsc:mpuComponent | 0 ... 1 | A description about the contents components of ATSC 3.0 Service delivered as MPUs |
| @atsc:MMT_Package_ID | M | Reference to a MMT Package for content components of the ATSC 3.0 Service delivered as MPUs. |
| @atsc:next_MMT_Package_ID | O | Reference to a MMT Package to be used after the one referenced by @atsc:MMT_Package_ID in time for content components of the ATSC 3.0 Service delivered as MPUs. |
| atsc:NRTComponent | 0 ... N | Contains information about components available in the service. For each component includes information about component type, component role, component name, component identifier, component protection flag. |
| @atsc:fullMPDUri | M | Reference to an MPD fragment which contains descriptions for contents components of the ATSC 3.0 Service delivered over broadcast and optionally, also over broadband. |
| @atsc:sTSIDUri | M | Reference to the S-TSID fragment which provides access related parameters to the Transport sessions carrying contents of this ATSC 3.0 Service. |
| atsc:AppSignaling | 0 ... 1 | Attribute indicates application which consumes the NRT components |

Legend:
For attributes: M = Mandatory, O = Optional, OD = Optional with Default Value, CM = Conditionally Mandatory.
For elements: <minoccurs> ... <maxoccurs> (N = unbounded)
Note that the conditions only holds without using xlink:href. If linking is used, then all attributes are "optional" and <minOccurs = 0>
Elements are bold; attributes are non-bold and preceded with an @.

Referring to Table 4, service signaling may provide a bundle description including a user service description (USD) to a receiver. The USD may include basic information such as at least one serviceId field for globally or uniquely in a scope of a broadcast area identifying a service, a Name and Lang field indicating a name of the service and a language of the name of the service, a serviceLanguage field indicating a valid language of the service, a capabilityCode field for specifying a capability required for the receiver and a capability group, and a channel field including information about a channel in a service (hereinafter, channel information), and at least one of DASH component information, MPU component information, and NRT component information.

The channel information may include at least one of a majorChannelNo field indicating a major channel number, a minorChannelNo field indicating a minor channel number, a serviceLang field indicating a primary language, a service genre field, a serviceIcon field indicating a URL for an icon used in a service, and a service description. The service description may include a serviceDescrText field indicating a service description text and a serviceDescrLang field indicating a language of the service description text.

The DASH component information may include at least one of a fullMPDUri field indicating a reference of an MPD fragment including a description for a content component, an sTSIDUri field indicating a reference of an S-TSID fragment providing access-related parameters of a transport session carrying content of a service, and a deliveryMethod field indicating whether transmission-related information associated with the content of the service is transmitted through a broadcasting network or a BB network. The deliveryMethod field may include at least one of a base pattern used by the receiver when the broadcasting network is used and a base pattern used by the receiver when the BB network is used.

The MPU component information may include at least one of an MMT_Package_ID field indicating a reference for an MMT package and a next_MMT_Package_ID field indicating a reference of an MMT packet to be used later.

The NRT component information may include a fullMPDUri field indicating a reference of an MPD fragment including a description for a content component, an sTSI-DUri field indicating a reference of an S-TSID fragment providing access-related parameters of a transport session carrying the content of the service, and an AppSignaling field indicating an application that consumes NRT components.

Figure 7:
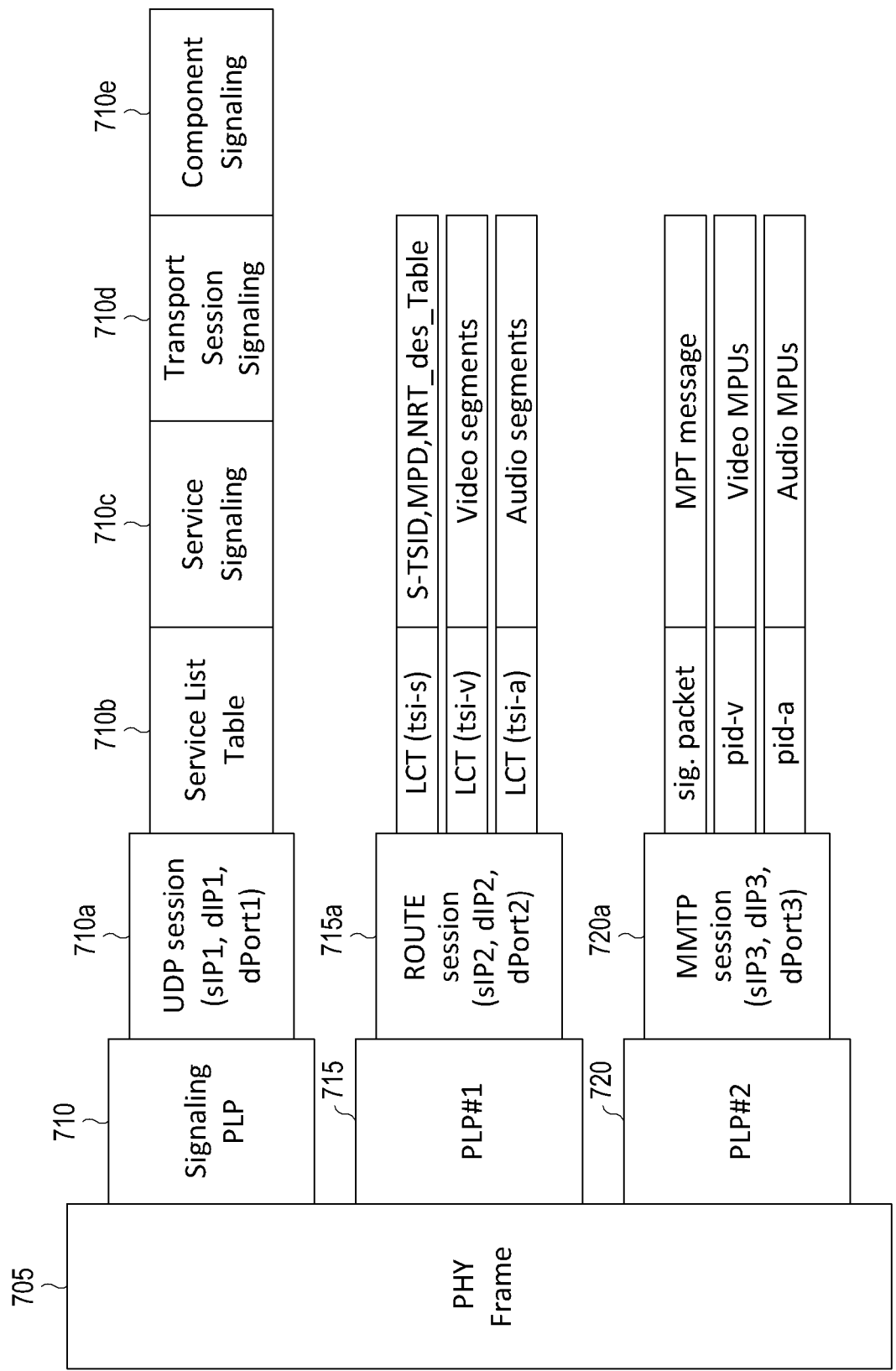
FIG. 7 illustrates an example of a physical channel configuration in a broadcasting system according to an embodiment of the present disclosure.

FIG. 7 illustrates an example of a physical channel configuration of an IP-based broadcasting system according to an embodiment of the present disclosure.

Referring to FIG. 7, a physical channel frame (PHY Frame) 705 corresponding to one physical channel may include one signaling PLP 710 and two data PLPs #1 and #2 715 and 720.

The signaling PLP 710 includes an UDP session 710*a* identified by [sIP1, dIP1, dPort1], and the UDP session 710*a* transmits a SLT 710*b*. In this case, the SLT 710*b* is transmitted in a binary format through a payload of a UDP packet or is encapsulated into the above-described message section and transmitted through the payload of the UDP packet. Moreover, the UDP session 710*a* may further carry at least one of service signaling 710*c*, transport session signaling 710*d*, and component signaling 710*e* in addition to the SLT 710*b*.

Herein, the SLT 710*b* is transmitted through the signaling PLP 710, but the service/transport session/component level signaling 710*c*, 710*d*, and 710*e* are transmitted through the signaling PLP 710 or through the data PLP 715 or 720 together with media data such as a video/audio segment/component. In case of the PLP #1 715 using the ROUTE protocol, in order for the receiver to identify a ROUTE packet including signaling information, a particular value (i.e., tsi-s) is set in tsi of a packet header of the ROUTE packet, and in case of the PLP #2 720 using the MMT protocol, to filter a packet including signaling, a separate field is set in a packet header of the packet such that the receiver identifies the packet including signaling.

The PLP #1 715 may include a ROUTE session 715*a* identified by [sIP2, dIP2, dPort2], and a ROUTE session 715*a* may include at least one layer coding transport (LCT) channel One LCT channel is identified by tsi-v and carries video segments, and another LCT channel is identified by tsi-a and carries audio segments. An LCT channel for signaling that may be additionally included is identified by tsi-s, and may carry signaling such as an S-TSID, MPD, or NRT description table.

The PLP #2 720 includes the MMTP session 720*a* identified by [sIP3, dIP3, dPort3], and the MMTP session 720*a* may include two channels identified by a packet ID and selectively, a signaling channel carrying signaling packets. A channel having a packet ID of pid-v carries video MPUs including a video component, and a channel having a packet ID of pid-a carries audio MPUs including an audio component. A signaling channel may carry an MPT message.

Table 5 shows an example of the SLT 710*b* according to an embodiment of the present disclosure. For example, the SLT may include at least one of IEs shown in Table 5.

TABLE 5

| Syntax | No. of Bits | Format |
|---|---|---|
| service_list_table_section( ) { | | |
|     table_id | 8 | uimsbf |
|     broadcast_stream_id | 16 | uimsbf |
|     num_services | 8 | uimsbf |
|     for (i=0; i<num_services;i++) { | | |
|         service_id | 16 | uimsbf |
|         reserved | 4 | '1111' |
|         major_channel_number | 10 | uimsbf |
|         minor_channel_number | 10 | uimsbf |
|         service_category | 4 | uimsbf |
|         short_service_name_length   /* m */ | 4 | uimsbf |
|         short_service_name( ) | 8*m | uimsbf |
|         broadcast_components_present | 1 | bslbf |
|         SLS_source_IP_address_present | 1 | bslbf |
|         SLS_session_present | 1 | bslbf |
|         reserved | 1 | '1' |
|         SLS_protocol_type | 4 | uimsbf |
|         SLS_protocol_version | 8 | uimsbf |
|         if (broadcast_components_present & SLS_session_present) { | | |
|             SLS_PLP_ID | 8 | uimsbf |
|             SLS_destination_IP_address | 32 | uimsbf |
|             SLS_destination_UDP_port | 16 | uimsbf |
|             if (SLS_source_address_present) { | | |
|                 SLS_source_IP_address | 32 | uimsbf |
|             } | | |
|         } | | |
|         reserved | 4 | '1111' |
|         num_service_level_descriptors | 4 | uimsbf |
|         for (j=0;j<num_service_level_descriptors;j++) { | | |
|             service_level_descriptor( ) | | var |
|         } | | |
|     } | | |
|     reserved | 4 | '1111' |
|     num_SLT_level_descriptors | 4 | uimsbf |
|     for (n=0; n<num_SLT_level_descriptors; n++) { | | |
|         SLT_level_descriptor( ) | | var |
|     } | | |
| } | | |

In Table 5, each element has a meaning as described below.

table_id—an identifier for identifying service_list_table_section( ) including a section of an SLT.

broadcast_stream_id—an identifier for identifying a broadcasting stream.

num_services—the number of services described in service_list_table_section( ).

service_id—a service identifier.

major_channel_number—an identification number used for a user to select a service.

minor_channel_number—a minor identification number used for a user to select a service.

service_category—a field indicating a category of a service, and may be defined as shown in Table 6.

TABLE 6

| service_category | Meaning |
| --- | --- |
| 0x00 | Not specified |
| 0x01 | Audio/Video service |
| 0x02 | Audio service |
| 0x03 | Application-based service |
| 0x04~0x0F | Reserved for future use | short_service_name_length—a length of short_service_name( ) in bits.

short_service_name( )—a character string indicating a service name. This is encoded by UTF-8 (8 bit Unicode Transformation Format).

broadcast_components_present—an indication of whether service signaling is transmitted through a broadcasting network.

SLS_source_IP_address_present—an indication of whether a source IP address is needed to define a session transmitting service signaling.

SLS_session_present—an indication of whether service signaling is transmitted through a session that is separate from a service list table.

SLS_protocol_type—a protocol according to which service signaling is transmitted. This may be defined as shown in Table 7.

TABLE 7

| SLS_protocol_type | Meaning |
| --- | --- |
| 0x00 | ATSC message section |
| 0x01 | ROUTE |
| 0x02 | MMTP |
| 0x03~0x0F | Reserved for future use |

SLS_protocol_version—a version of a protocol according to which service signaling is transmitted The following fields may exist when both a broadcast_components_present field and a SLS_session_present field have a value of 1

SLS_PLP_ID—an identifier of a PLP through which service signaling is transmitted SLS_destination_IP_address—a destination IP address of a session in which service signaling is transmitted SLS_destination_UDP_port—a destination UDP port of a session in which service signaling is transmitted SLS_source_IP_address—a destination IP address of a session in which service signaling is transmitted In an embodiment of the present disclosure, some field(s) shown in Table 5 may be omitted and other field(s) may be added. For example, in a system where service signaling is delivered through a broadcasting network at all times, broadcast_components_present of Table 5 may be omitted.

In another example, when service signaling is transmitted using an identical protocol at all times, SLS_protocol_type may be omitted.

Figure 8:
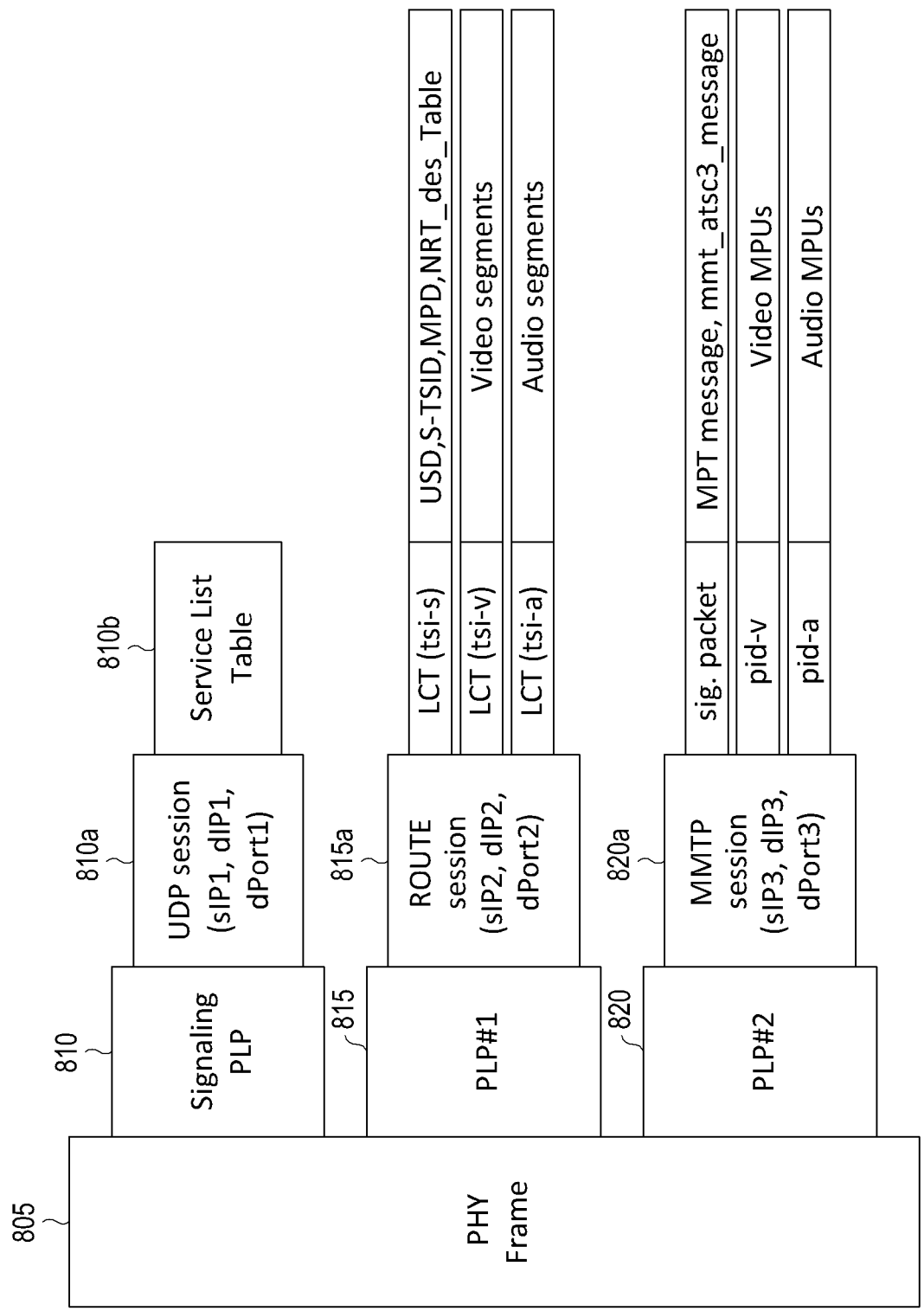
FIG. 8 illustrates an example of a physical channel configuration in a broadcasting system according to an embodiment of the present disclosure.

FIG. 8 illustrates an example of a physical channel configuration in a broadcasting system according to an embodiment of the present disclosure.

Referring to FIG. 8, a physical channel frame (PHY Frame) 805 corresponding to one physical channel may include one signaling PLP 810 and two data PLPs #1 and #2 815 and 820.

The signaling PLP 810 includes an UDP session 810a identified by [sIP1, dIP1, dPort1], and the UDP session 810a transmits a service list table 810b. The service table list 810b is transmitted through a payload of a UDP packet in its originally binary format. When the service table list 810b is configured in an XML format, the service table list 810b in the XML format is encapsulated into a form of a binary message and transmitted through a payload of a UDP packet. The binary message may further include binary fields for identifying a type, a length, and a version of an XML document expressing the service table list 810b as well as the XML document.

Herein, the UDP session 810a in which the service list table 810b is transmitted is delivered through the signaling PLP 810, but in another embodiment, the UDP session 810a is transmitted through the data PLP 815 or 820 in the same manner as a ROUTE or MMTP session 815a or 820a in which media data such as a video/audio segment/component is transmitted. In this case, the UDP session 810a in which the service list table 810b is transmitted uses an IP address and an UDP port number that are fixed in advance by a standard, a system operator, etc., or may be set to a receiver through another means such as Internet, etc.

The PLP #1 815 may include the ROUTE session 815a identified by [sIP2, dIP2, dPort2], and the ROUTE session 815a may include at least one layer coding transport (LCT) channel One LCT channel is identified by tsi-v and carries video segments, and another LCT channel is identified by tsi-a and carries audio segments. An LCT channel for signaling that may be additionally included is identified by tsi-s, and may carry a signaling message such as an S-TSID, MPD, or NRT description table.

The PLP #2 820 includes the MMTP session 820a identified by [sIP3, dIP3, dPort3], and the MMTP session 820a may include two channels identified by a packet ID and selectively, a signaling channel carrying signaling packets. A channel having a packet ID of pid-v carries video MPUs including a video component, and a channel having a packet ID of pid-a carries audio MPUs including an audio component. A signaling channel carries an MPT message or a signaling message such as mmt_atsc3_message.

Service/transport session/component level signaling transmitted through the MMTP session 820a are encapsulated into mmt_atsc3_message and are transmitted using a signaling message mode of the MMTP session 820a. Table 8 shows an example of IEs included in mmt_atsc3_message. For example, mmt_atsc3_message may include at least one of IEs shown in Table 8.

TABLE 8

| Syntax | No. of Bits | Format |
| --- | --- | --- |
| mmt_atsc3_message( ) { | | |
|    message_id | 16 | uimsbf |
|    version | 8 | uimsbf |
|    length | 32 | uimsbf |

TABLE 8-continued

| Syntax | No. of Bits | Format |
|---|---|---|
| message payload { | | |
|     service_id | 16 | uimsbf |
|     atsc3_message_payload_type | 8 | uimsbf |
|     atsc3_message_payload_version | 8 | uimsbf |
|     URI_length | 8 | uimsbf |
|     for (i=0;i< URI_length;i++) { | | |
|         URI_byte | 8 | uimsbf |
|     } | | |
|     for (i=0;i<length-5-URI_length;i++) { | | |
|         atsc3_message_payload_byte | 8 | uimsbf |
|     } | | |
| } | | |
| } | | |

In Table 8, each element has a meaning as described below.

message_id—a 16-bit identifier for identifying mmt_atsc3_message( ).

version—an 8-bit identifier for identifying a version of mmt_atsc3_message( ).

length—a 32-bit field indicating a byte-based length of mmt_atsc3_message( ). The length of mmt_atsc3_message( ) may indicate the number of bytes from a byte following the length field to the last byte of mmt_atsc3_message( ).

A message payload in mmt_atsc3_message( ) may include at least one of the following elements.

service_id—a 16-bit identifier for identifying a service to which information transmitted through a message payload of mmt_atsc3_message( ) is applied. This is set to the same value as that of an atsc:serviceId field of a user service description to be described below.

atsc3_message_payload_type—a 16-bit identifier for identifying a type of the information transmitted through the message payload of mmt_atsc3_message( ). This may be defined as shown in Table 9.

TABLE 9

| atsc3_message_payload_type | Meaning |
|---|---|
| 0x00 | Reserved |
| 0x01 | User Service Description |
| 0x02 | MPD |
| 0x03 | Service Guide Delivery Unit |
| 0x04 | Application Information Table |
| 0x05 | Application Event Information |
| 0x06~0xFF | Reserved for future use | atsc3_message_payload_version—an 8-bit identifier for identifying a version of information transmitted through the message payload of mmt_atsc3_message( ) The message payload may be identified by a combination of service_id and atsc3_message_payload_type.

URI_length—an 8-bit field indicating a length of an URI used to identify the message payload. This has a value of 0 when this message does not provide the URI.

URI_byte—an 8-bit field indicating each byte of the URI used to identify the message payload. This is expressed as an UTF-8 character and does not include a terminating null character.

atsc3_message_payload_byte—an 8-bit field indicating each byte of information transmitted through the message payload.

Figure 9:
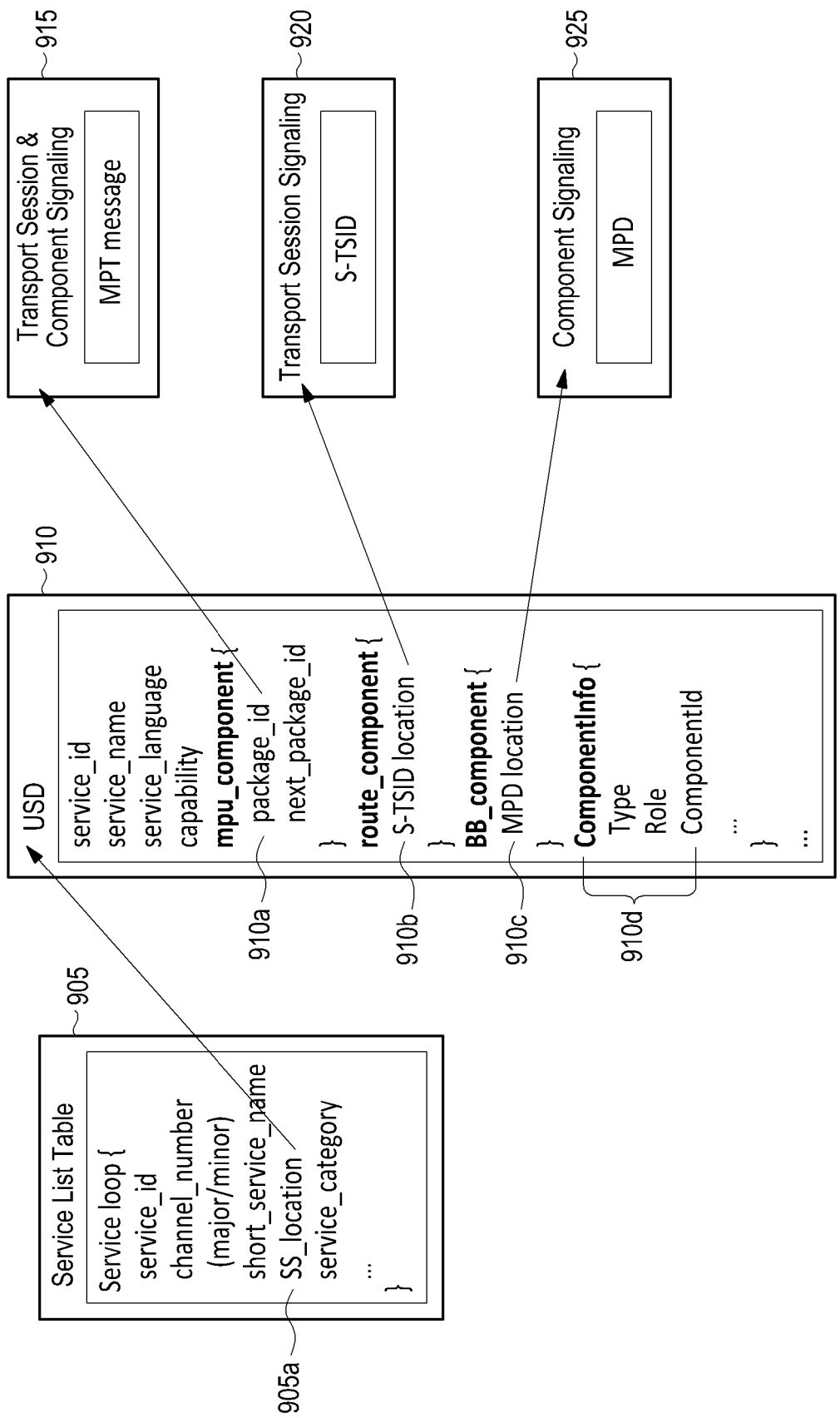
FIG. 9 illustrates an example of a signaling configuration scheme of a broadcasting system according to an embodiment of the present disclosure.

FIG. 9 illustrates an example of a signaling configuration scheme of an IP-based broadcasting system according to an embodiment of the present disclosure.

Referring to FIG. 9, a service list table (SLT) 905 may include SS_location 905a indicating a service signaling location for obtaining a user service description (USD) 910 providing service signaling, together with basic information about a service such as service_id indicating a service ID for each service, channel_number indicating a channel number, short_service_name indicating a short service name, and service_category indicating a service category.

The USD 910 provides basic information such as service_id, service_name, service_language, and capability. The USD 910 also includes signaling needed to obtain and use each component of a service. In the IP-based broadcasting system referred to in FIG. 9, real-time media data delivered over a braodcasting network is transmitted using an MMT protocol in an MPU format, and non-real time (NRT) media data is transmitted using an ROUTE protocol. To this end, the USD 910 includes MPU component information MPU_component for the MMT protocol, ROUTE component information ROUTE_component, a BB component information BB_component, and component signaling information componentinfo 910d. Herein, real-time media data transmitted through a BB network is transmitted in a DASH format.

The MPU component information includes a package_id field 910a indicating a path of obtaining a transport session and component signaling 915 for an MPU. The ROUTE component information includes an S-TSID location field 910b indicating a path of obtaining transport session signaling 920 for transmission of a DASH segment. The BB component information includes an MPD location field 910c indicating a path of obtaining component signaling 925 for real-time media data. The USD 910 may include component signaling information 910d indicating a type, a role, an identifier, etc., of a component.

Elements included in the user service description 910 in addition to service signaling for expressing a general broadcasting service will be described in more detail as below.

1) The USD 910 provides a package identifier package_id 910a necessary for obtaining the transport session and component signaling 915 including an MPT message for a particular service. The MPT message includes information about an MMTP session for obtaining a media transmitted in an MPU format, packet_id of an MMT packet, and a part of component signaling.

2) The USD 910 provides the S-TSID location information 910b required for obtaining NRT data transmitted according to the ROUTE protocol. The location information 910b may include at least one of a source IP address, a destination IP address, a destination UDP port number, a PLP identifier, an URI of an S-TSID, and information about a version of the ROUTE protocol according to which the S-TSID is transmitted.

3) The USD 910 includes MPD location information 910c required for obtaining a DASH component transmitted through the BB network.

4) A part 910d of component signaling for a service component transmitted through the BB network is included.

An example of the USD 910 including a part of service signaling and component signaling is shown in Table 10.

TABLE 10

| Element or Attribute Name | Use | Description |
| --- | --- | --- |
| bundleDescription | | Root element of the User Service Bundle Description. |
| UserServiceDescription | | A single instance of an ATSC 3.0 Service. |
| @serviceId | M | Globality unique identifier of the ATSC 3.0 Service. |
| @atsc:serviceID | M | Reference to corresponding service entry in LLS(SLT). The value of this attribute is the same value of serviceId assigned to the entry. |
| Name | 0 . . . N | Name of the ATSC 3.0 service as given by the lang attribute |
| Lang | CM | Language of the ATSC 3.0 service name. The language shall be specified according to XML datatypes. |
| serviceLanguage | 0 . . . N | Available languages of the ATSC 3.0 service. The language shall be specified according to XML datatypes. |
| atsc:capabilityCode | 0 . . . 1 | Specifies the capabilities and capability groups, as defined in the ATSC 3.0 Service Announcement and Personalization standard, required in the receiver to be able to create a meaningful presentation of the content of this ATSC service. The format of this element shall be identical to the atsc:capabilities element specified under the Content fragment of the ATSC 3.0 Service Announcement and Personalization specification. |
| atsc:Channel | 1 | Contains information about the channel in the service |
| @atsc:majorChannelNo | O | Attribute indicates the major channel number of the service. |
| @atsc:minorChannelNo | O | Attribute indicates the minor channel number of the service. |
| @atsc:serviceLang | O | Atrribute indicates the primary language used in the service. Semantics of xml:lang shall be followed. |
| @atsc:serviceGenre | O | Attribute indicates primary genre of the service. This attribute shall be instantiated to describe the genre category for the service. The <classificationSchemeURI> is http:///www.atsc.org/XML Schemas/mh/2009/1.0/genre-cs/ and the value of serviceGenre shall matches a termID value from the classification schema in Annex B of A/153 Part 4. |
| @atsc:serviceIcon | M | Attribute indicates the Uniform Resource Locator (URL) for the icon used to represent this service. |
| atsc:ServiceDescription | 0 . . . N | Contains service description possibly in multiple languages. |
| @atsc:serviceDescrText | M | Attribute indicates description of the service. |
| @atsc:serviceDescrLang | O | Attribute indicates the language of the serviceDescrText. Semantics of xml:lang shall be followed. |
| atsc:mpuComponent | 0 . . . 1 | A description about the contents components of ATSC 3.0 Service delivered as MPUs. |
| @atsc:MMT_Package_ID | M | Referecne to a MMT Package for content components of the ATSC 3.0 Service delivered as MPUs. |
| @atsc:next_MMT_Package_ID | O | Referecne to a MMT Package to be used after the one referenced by @atsc:MMT_Package_ID in time for content components of the ATSC 3.0 Service delivered as MPUs. |
| atsc:routeComponent | 0 . . . 1 | A description about the contents components of ATSC 3.0 Service delivered by ROUTE. |
| @atsc:sTSIDUri | M | Reference to the S-TSID fragment which provides access related parameters to the Transport sessions carrying contents of this ATSC 3.0 Service. |
| @slsPlpId | OD | A string representing an integer number indicating the PLP ID of the physical layer pipe carrying the SLS for this service. (default: current physical layer pipe) |
| @slsDestinationIpAddress | OD | A string containing the dotted-IPv4 destination address of the packets carrying SLS data for this service. (default: current MMTP session's source IP address) |
| @slsDestinationUdpPort | M | A string containing the port number of the packets carrying SLS data for this service. |

TABLE 10-continued

| Element or Attribute Name | Use | Description |
|---|---|---|
| @slsSourceIpAddress | M | A string contining the dotted-IPv4 source address of the packets carrying SLS data for this service. |
| @slsMajorProtocolVersion | OD | Major version number of the protocol used to deliver the Service Layer Signaling for this service. Default value is 1. |
| @slsMinorProtocolVersion | OD | Minor version number of the protocol used to deliver the Service Layer Signaling for this service. Default value is 0. |
| atsc:broadbandComponent | 0 . . . 1 | A description about the contents components of ATSC 3.0 Service delivered by broadband. |
| @atsc:fullfMPDUri | M | Reference to an MPD fragment which contains descriptions for contents components of the ATSC 3.0 Service delivered over broadband. |
| atsc:ComponentInfo | 1 . . . N | Contains information about components available in the service. For each component includes information about component type, component role, component name, component identifier, component protection flag. |
| @atsc:componentType | M | Attribute indicates the type of this component. Value of 0 indicates an audio component. Value of 1 indicates a video component. Value of 2 indicated a closed caption component. Value of 3 indicates an application component. Values 4 to 7 are reserved. |
| @atsc:componentRole | M | Attribute indicates the role or king of this component. For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254 = reserved, 255 = Unknown. For Video (when componentType attribute above is equal to 1) values of componentRole attribute are as follows: 0 = Primary video, 1 = Alternative camera view, 2 = Other alternative video component, 3 = Sign language inset, 4 = Follow subject video, 5 = 3D video left view, 6 = 3D video right view, 7 = 3D video depth information, 8 = Part of video array <x, y> of <n, m>, 9 = Follow-Subject metadata, 10-254 = reserved, 255 = unknown. For Closed Caption component (when componentType attribute above is equal to 2) value of componentRole attribute are as follow: 0 = Normal, 1 = Easy reader, 2-254 = reserved, 255 = unknown. When componentType attribute above is between 3 to 7, inclusive, the componentRole shall be equal to 255. |
| @atsc:componentProtectedFlag | OD | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| @atsc:componentId | M | Attribute indicates the identifier of this component, The componentId shall be unique within the service. |
| @atsc:componentName | O | Attribute indicates the human readable name of this component. |

Legend:
For attributes: M = Mendatory, O = Optional, OD = Optional with Default Value, CM = Conditionally Mandatory,
For elements: <minoccurs> . . . <maxoccurs> (N = unbounded)
Note that the conditions only holds without using xlink:href. If linking is used, then all attributes are "optional" and <minOccurs = 0>
Elements are bold: attributes are not-bold and proceded with an @.

In Table 10, MPU component information, an atsc:mpuComponent field may include at least one of an MMT_Package_ID field indicating a reference for an MMT package and a next_MMT_Package_ID field indicating a reference of an MMT packet to be used later.

ROUTE component information, an atsc:routeComponent field may include an sTSIDUri field indicating a reference of an S-TSID fragment, an slsplpId field indicating an integer expressing an identifier of a PLP that carries service signaling, slsDestinationIpAddress, slsDestination- UdpPort, and slsSourceIPAddress fields including a destination IP address, a destination port number, and a source IP address of a packet carrying service signaling, and slsMajorProtocolVersion and slsMinorProtocolVersion fields indicating a major version number and a minor version number of a protocol used to carry service signaling.

BB component information, an atsc:broadbandComponent field includes a fullfMPDUri field indicating a reference of an MPD fragment including a description of a content component of a service carried through a BB network.

Component signaling information, an atsc:ComponentInfo field includes at least one of a component type and a component role, a componentProtectedFlag field indicating whether a component is protected, a component identifier, and a component name.

Herein, a value of an @atsc:componentId field indicating the component identifier is the same as an asset ID of an MPT when the component is transmitted in an MPU format in real time by using the MMT protocol and, when the component is an NRT component transmitted using the ROUTE protocol, the value is the same as an URI indicating a file.

The atsc:ComponentInfo field may further include a field indicating whether each component is transmitted in the MPU format in real time by using the MMT protocol or in an NRT mode by using the ROUTE protocol.

Figure 10:
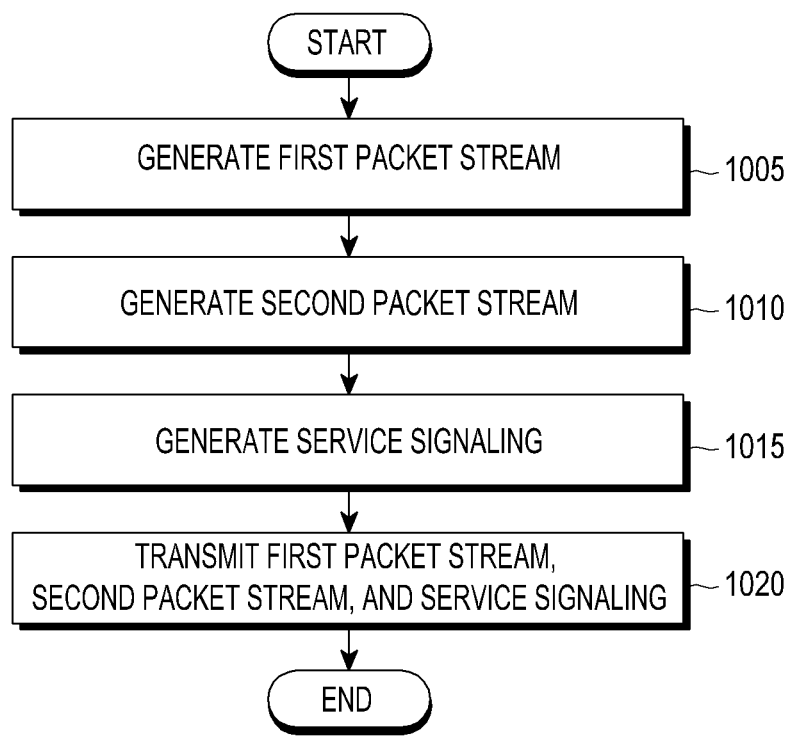
FIG. 10 is a flowchart illustrating a transmission procedure of a broadcasting service and service signaling according to an embodiment of the present disclosure.

FIG. 10 is a flowchart illustrating a transmission procedure of a broadcasting service and service signaling according to an embodiment of the present disclosure.

Referring to FIG. 10, a transmitter generates a first packet stream according to a first transport protocol in operation 1005, generates a second packet stream according to a second transport protocol in operation 1010, and generates service signaling related to the first packet stream and the second packet stream. Herein, operations 1005, 1010, and 1015 may be performed sequentially, simultaneously, or independently of one another.

In operation 1020, the transmitter transmits the first packet stream and the second packet stream by using the first transport protocol and the second transport protocol, respectively. The service signaling may be transmitted using a separate signaling section or at least a part of the service signaling may be transmitted in a broadcasting signal by using at least one of the first transport protocol and the second transport protocol. At least a part of the service signaling may be transmitted through a BB network.

Figure 11:
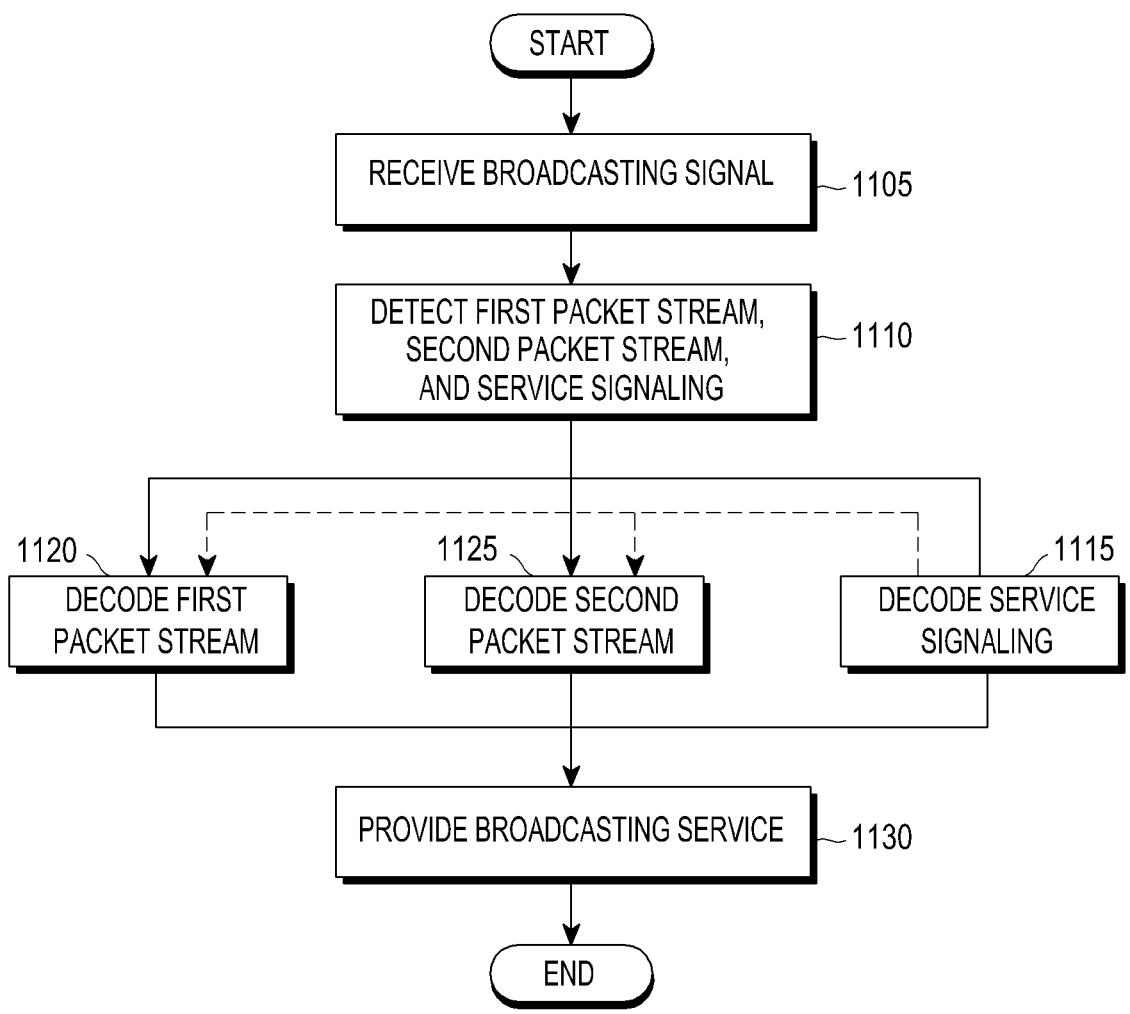
FIG. 11 is a flowchart illustrating a transmission procedure of a broadcasting service and service signaling according to an embodiment of the present disclosure.

FIG. 11 is a flowchart illustrating a reception procedure of a broadcasting service and service signaling according to an embodiment of the present disclosure.

Referring to FIG. 11, a receiver receives a broadcasting signal through a broadcasting network in operation 1105, and interprets the broadcasting signal according to the first transport protocol and the second transport protocol to detect a first packet stream and a second packet stream, respectively, in operation 1110. The receiver detects service signaling from the broadcasting signal and, selectively, a BB signal received through the BB network.

In operations 1120 and 1125, the receiver decodes the first packet stream and the second packet stream to detect a media, a file, and signaling. The receiver may use at least some information of service signaling decoded in operation 1115 to decode the first packet stream and the second packet stream.

In operation 1130, the receiver provides a broadcasting service to a user by using the signaling information detected by decoding of the service signaling and the detected media, file, and signaling.

Various embodiments of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing a program processor to execute a preset signaling method, information necessary for the signaling method, a communication unit for performing wired or wireless communication with a signaling processor, and a controller for transmitting a corresponding program to a transceiver at the request of the signaling processor or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for transmitting service signaling for a broadcasting service, the method comprising:

transmitting a service list table (SLT) comprising information related to the service signaling;
transmitting the service signaling related to the broadcasting service; and
transmitting a stream comprising at least one packet or at least one segment which comprises data of the broadcasting service as a whole or in part,
wherein the SLT comprises location information related to the service signaling and protocol information indicating a delivery protocol for transmitting the service signaling,
wherein, if the protocol information has a first value, the protocol information indicates that real-time object delivery over unidirectional transport (ROUTE) protocol is used for delivering the service signaling,
wherein, if the protocol information has a second value, the protocol information indicates that an MPEG Media Transport (MMT) protocol is used for delivering the service signaling,
wherein the SLT further comprises a first field indicating whether a source IP address is needed to define a session transmitting service signaling, a second field indicating whether the service signaling is transmitted through a session that is separate from the SLT, a third field indicating whether the service signaling is transmitted through a broadcasting network, a fourth field indicating a number of service level descriptors in the SLT, and a fifth field indicating a number of SLT level descriptors in the SLT, and
wherein, when processing the SLT, if both the second field and third field have a value of '1', whether the first field indicates that the source IP address is needed to define a session transmitting the service signaling is determined.

2. The method of claim 1, wherein the SLT further comprises identification information for the broadcasting service and category information for the broadcasting service.

3. The method of claim 2, wherein the category information comprises information of whether the broadcasting service is audio/video service, whether the broadcasting service is audio service, and whether the broadcasting service is application-based service.

4. The method of claim 1, wherein the location information comprises a destination IP address related to the service signaling and destination port information related to the service signaling.

5. The method of claim 1, wherein the SLT further comprises channel number information provided for selecting of the broadcasting service.

6. The method of claim 1, wherein the service signaling comprises session information related to a session in which the stream is transmitted.

7. The method of claim 6, wherein the session information comprises at least one of the source IP address related to the session, a destination IP address related to the session or destination port information related to the session.

8. The method of claim 6, wherein the session information comprises identification information for identifying a sub session of the session which is a transport channel for the stream.

9. The method of claim 1, wherein the service signaling comprises at least one of identification information for the broadcasting service, name information for the broadcasting service, or language information for the broadcasting service.

10. The method of claim 1, wherein the service signaling comprises a media presentation description (MPD), if the data is media data.

11. The method of claim 1,
wherein the service signaling is transmitted in a message, and
wherein the message comprises type information for identifying a type of content included in the message.

12. The method of claim 11, wherein the type information comprises information of whether the content is a media presentation description (MPD).

13. The method of claim 12, wherein the message comprises uniform resource identifier (URI) byte information of the content and URI length information of the content.

14. The method of claim 11,
wherein the message comprises version information for the content and identification information for the broadcasting service, and
wherein the identification information for the broadcasting service and the type information are used for identifying the content.

15. The method of claim 11, wherein the message comprises at least one of identification information for the message, version information for the message, or byte length information of the message.

* * * * *